Feb. 21, 1933.                A. F. KUESTER                1,898,191
                SPRING MOUNTING FOR MOTOR VEHICLES AND TRAILERS
                        Filed March 23, 1932        2 Sheets-Sheet 1
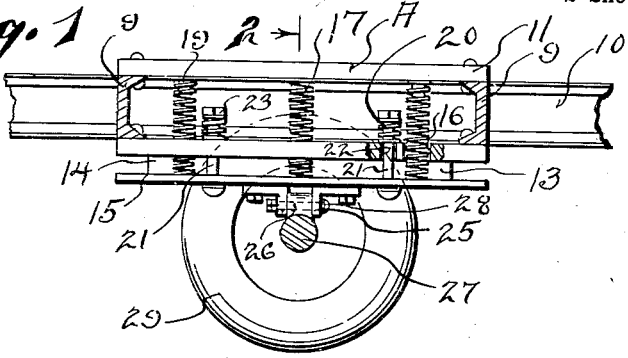
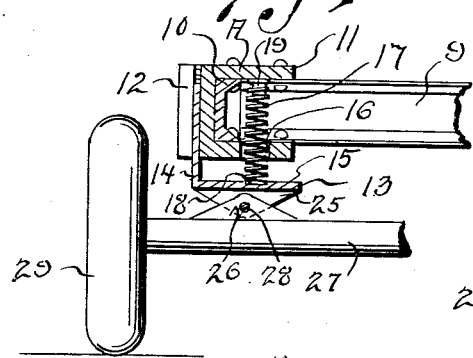
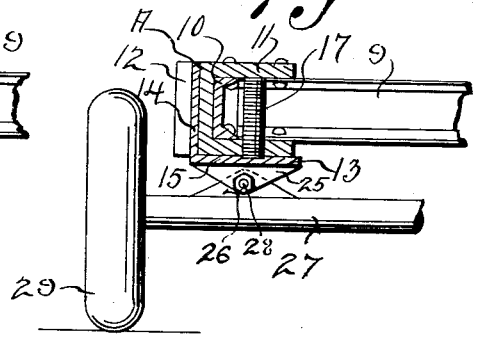
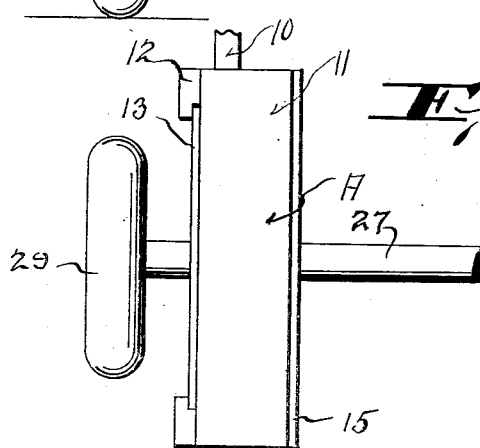
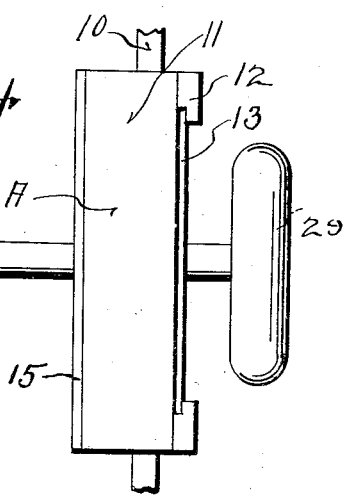
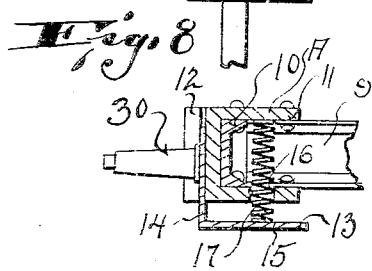
Inventor
A. F. Kuester
By [signature]
Attorneys Feb. 21, 1933.  A. F. KUESTER  1,898,191
SPRING MOUNTING FOR MOTOR VEHICLES AND TRAILERS
Filed March 23, 1932  2 Sheets-Sheet 2
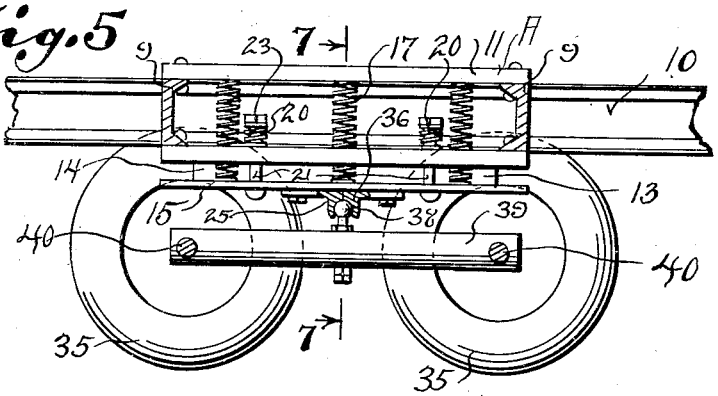
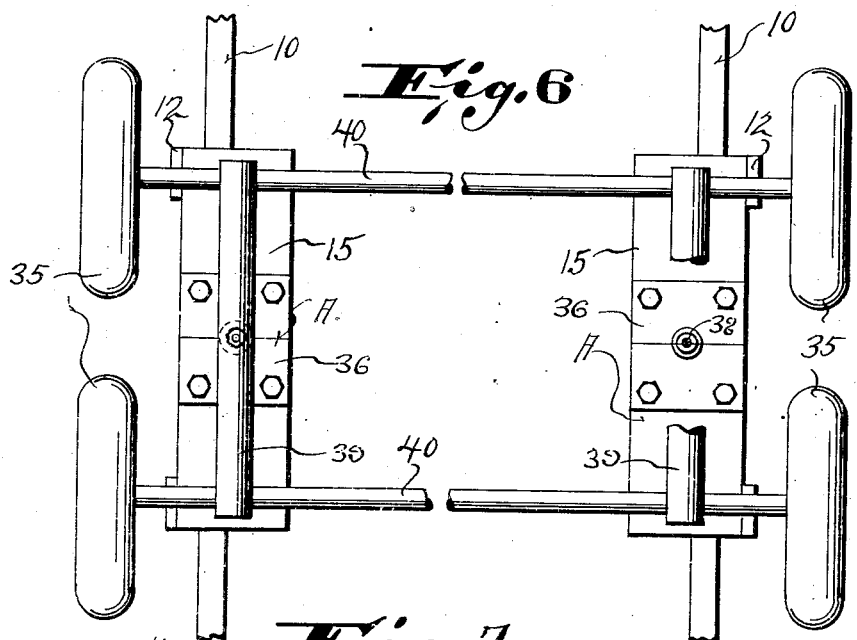
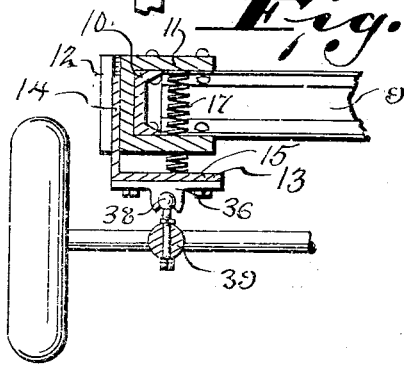

Patented Feb. 21, 1933

1,898,191

UNITED STATES PATENT OFFICE

AUGUST F. KUESTER, OF CLINTONVILLE, WISCONSIN

SPRING MOUNTING FOR MOTOR VEHICLES AND TRAILERS

Application filed March 23, 1932. Serial No. 600,712.

This invention appertains to spring suspensions for motor vehicles and trailers, and is an improvement over my previous application for patent for trailers, Serial No. 468,250, filed July 16, 1930, now Patent No. 1,835,653, Dec. 8, 1931.

In the application above referred to, means was employed between the body of the vehicle and the supporting wheels, for absorbing shock between the body and the wheels incident to the passage of the vehicle over a rough roadway.

While this construction effectively accomplished the purpose intended, certain difficulties were inherent with the arrangement shown. Thus, the supporting brackets utilized for connecting the body and wheels hung a predetermined distance below the body and this distance had to be increased when longer springs were needed for supporting the body.

It is, therefore, one of the primary objects of my invention to provide a novel spring suspension for motor vehicles, in which the supporting brackets carrying the wheels are associated with the chassis of the vehicle in a novel manner, whereby the brackets will be moved into intimate contact with the lower face of the frame of the vehicle when the springs arranged between the brackets and frame are compressed, so that substantially all projecting parts below the frame will be eliminated.

A further object of my invention is the provision of means whereby the active length of the supporting springs can be increased over that used in the application referred to, whereby a greater shock absorbing quality can be had between the wheels and the frame.

A further object of my invention is the provision of means whereby the spring suspension can be readily associated with the side channel beams of the chassis or vehicle frame, whereby all lateral shifting and end play between the brackets and the frame will be prevented.

A still further object of my invention is to provide a spring suspension for motor vehicles embodying vertically arranged coil springs in lieu of elliptical or semi-elliptical leaf springs, and in which different types of axles can be utilized for different types of motor vehicles and trailers.

A still further object of my invention is to provide an improved spring suspension for vehicles of the above character, which will be durable and efficient in use, one that will be simple and easy to manufacture and one which can be placed upon the market at a reasonable cost.

With these and other objects in view, the invention consists in the novel construction, arrangement and formation of parts, as will be hereinafter more specifically described, claimed and illustrated in the accompanying drawings in which:

Figure 1 is a fragmentary longitudinal section through the frame of a vehicle illustrating my novel spring suspension;

Figure 2 is a fragmentary transverse section taken on the line 2—2 of Figure 1, looking in the direction of the arrows;

Figure 3 is a view similar to Figure 2, but showing the supporting coil springs in ther full compressed condition;

Figure 4 is a fragmentary top plan view of the frame of a vehicle showing my improved type of spring suspension incorporated therewith;

Figure 5 is a view similar to Figure 1, illustrating the use of tandem ground wheels with my spring suspension;

Figure 6 is a fragmentary bottom plan view illustrating the use of tandem ground wheels with the spring suspension, Figure 7 is a detailed transverse sectional view taken on the line 7—7 of Figure 5, looking in the direction of the arrows;

Figure 8 is a fragmentary transverse sectional view illustrating the use of a stub axle with my improved type of spring support for trailers of the underslung type.

Referring to the drawings in detail, wherein similar reference characters designate corresponding parts throughout the several views, the letter "A" generally indicates my improved spring suspension for use in conjunction with the trailer of a motor vehicle.

While I have stated that the spring suspension is utilized with a trailer, it is obvious that the spring suspension can be utilized with motor vehicles of any character.

As shown in the drawings, the frame of the vehicle includes the usual longitudinally extending side channel beams 10, to which the body or floor of the vehicle is attached.

In accordance with my invention, I utilize substantially U-shaped body members 11, which are placed over the sides of the channel beam 10, with the flanges of the U-shaped body members projecting inwardly from the said channel beams. Transverse channel beams 9 can be rigidly secured to the upper and lower leg portions of the body members, if so desired, as shown in the drawings.

Secured to the outer faces of the supporting body members 11, are vertically disposed guide tracks 12. These guide tracks 12 are arranged adjacent to the opposite ends of the body members and form means for slidably supporting the L-shaped slide brackets 13. These L-shaped slide brackets 13 extend substantially the full length of the body members 11 and each include the vertically disposed flange or leg 14 and the inwardly directed flange or leg 15.

The vertical flange of each slide bracket is placed in facial engagement with the outer surface of its body member and the side edges of this flange are received within the guideways 12 for vertical movement. The horizontal flange 15 of the supporting brackets are disposed under the body members 11, as clearly shown in the drawings.

At spaced points the lower legs of the U-shaped body member 11 is provided with openings 16, through which extend the relatively long heavy expansion coil springs 17. The lower ends of the coil springs 17 are seated within sockets 18 formed in the upper face of the horizontal flange of the supporting bracket. The upper ends of the springs 17 are placed over depending holding lugs 19 secured to the inner face of the top leg of the body members.

This provides a resilient connection between the frame of the vehicle and the slide brackets 13. The slide brackets 13 carry any preferred type of axle or axles for the ground wheels, as will be hereinafter more fully set forth. In connection with the supporting springs 17, I also prefer to use relatively short re-bound springs 20. These rebound springs 20 are arranged inside of the body members 11 and are placed about holding bolts 21, which extend through openings 22 formed in the lower leg of the body member.

The holding bolts 21 likewise extend through the lower flange 15 of the supporting bracket 13 and adjustable nuts 23 are threaded on the bolts against the upper ends of the re-bound springs 20. By this arrangement of parts, the tension of the rebound springs can be adjusted and the springs can be effectively held in place.

Obviously, from the construction so far, it can be seen that I can utilize heavier and longer expansion springs between the body of the vehicle and the supporting wheels than were used in my patent, referred to. Likewise, when the vehicle is under extreme load, the body members 11 rest directly on the upper faces of the horizontal flanges of the slide brackets 13. This eliminates projecting parts under the chassis of the vehicle, which is particularly important in vehicles of the underslung type. Likewise, the construction prevents all lateral shifting of the slide brackets and thus prevents side swaying of the vehicle body on the supporting wheels.

In Figures 1 to 4 inclusive, I have shown the lower faces of the slide brackets 13 provided with angle bearing plates 25, which receive therebetween a pivot lug 26 carried by the transverse axle 27. A bolt 28 extends through the angle bearing plates 25 and the pivot lug 26. The ends of the axle 27 carry the ground wheels 29. The axle 27 can either be of the live or dead type and where a live axle is utilized, the pivot lug 26 is carried by the casing for the axle.

In Figure 8 of the drawings, I have shown the vertical flange 14 of the slide brackets 13 provided with outwardly extending stub axles 30 for receiving the ground wheels. In this instance, the angle plates 25 are eliminated and an underslung vehicle structure will be had.

In Figures 5 to 7 inclusive, I have shown the improved spring suspension utilized with tandem ground wheels 35. When the ground wheels 35 are used, the bearing plates 25 are replaced by socket 36 for receiving a ball 38, which is carried by the longitudinal extending axle beam 39.

The ends of the axle beam 39 carry the transverse axles 40 in any desired way and terminals of the axle support the ground wheels 35. The axles 40 can be either of the live or dead type, as will be readily apparent to those skilled in the art.

By this construction, swinging movement of the axle beams 39 is permitted, in that a universal joint connection is had between the axle beams 39 and the slide brackets.

My improved spring suspension is particularly adapted for motor trucks utilizing tandem rear wheels. Generally on motor trucks of this type, semi-elliptical leaf springs are utilized and these springs are anchored by means of shackle bolts at their central portions to the chassis frame. The terminals of the springs, are then anchored to the transverse axles of the truck which carry the ground wheels.

Incident to the flexing of the semi-elliptical leaf springs, the axles are forced toward and away from one another, which causes a strain on the driving connection of the truck. In my arrangement, the axles 40 are held at all times in the same relation, but at the same time, an adequate resilient support is interposed between the chassis frame and ground wheels.

Referring again to Figures 1 to 4 inclusive of the drawings, it can be seen that it is merely necessary to remove a single bolt 28, when it is desired to disconnect the axle from the slide bracket. This allows repairs to be readily made.

The pivot point for the axles or axle beams can be placed at the most desirable location on the brackets 13, so that the proper balance can be had. In some instances, it may be desirable to have the channel beams 10 arranged inward of the vertical flanges of the body members 11. With this arrangement, a set of springs 17 can be disposed between the inner faces of the body members 11 and the channel beams 10.

By my novel arrangement of slide brackets 13 and body members 11, hydraulic or other shock absorbers can be used therebetween.

Changes in details may be made without departing from the spirit or the scope of this invention, but what I claim as new is:

1. In a vehicle, body members having upper and lower spaced legs, slide brackets associated with the body members having a horizontally disposed flange underlying the body member, the lower leg of the body member being provided with a plurality of openings, expansion coil springs disposed through the openings and interposed between the top leg of the body member and the horizontal flange of the slide bracket, and a ground wheel associated with the slide bracket.

2. In a vehicle, a body member having upper and lower horizontally disposed legs, a slide bracket mounted on the body member having a horizontal flange underlying the body member, the lower leg of the body member being provided with a plurality of openings, expansion springs extending through the openings and having their opposite ends engaging the upper leg of the slide bracket, a supporting axle connected with the slide bracket and rebound springs operatively arranged between the slide bracket and the body member.

3. In a vehicle, a body member having upper and lower legs, a slide bracket associated with the body member having a horizontal flange underlying the body member, the lower legs of the body member being provided with a plurality of openings, expansion coil springs extending through the openings, and having the opposite ends thereof engaging the upper leg of the body member and the horizontal flange of the bracket, a supporting axle connected with the slide bracket, bolts associated with the slide bracket extending through the lower leg of the body member, springs arranged on the upper ends of the bolts, and adjusting members threaded on the bolts engaging the upper ends of the last mentioned springs.

4. In a vehicle, a body member having upper and lower spaced legs, the lower leg being provided with a plurality of spaced openings, vertically disposed guide tracks carried by the outer face of the body member, an angle-shaped slide bracket having a vertical flange and a horizontally disposed flange, the vertical flange being arranged in facial abutment with the outer face of the body member and having its side edges slidably mounted in the guideway, the horizontal flange underlying the body member, expansion springs extending through the openings and having their opposite ends engaging the top leg of the body member and the horizontal flange of the slide bracket, and a supporting axle removably connected with the slide bracket.

5. In a vehicle, a body member, a vertically movable slide bracket mounted on the body member, expansion coil springs interposed between the slide bracket and body member, an axle, a supporting lug for the axle, depending ears on the slide bracket receiving the lug, and a removable bolt connecting the ears and lug together.

6. In a vehicle, longitudinally extending frame beams, a U-shaped body member receiving a frame beam and having the upper and lower legs thereof projecting beyond the inner face of the beam, the lower leg of the body member being provided with a plurality of openings, a vertically movable slide bracket mounted on the body member having a bottom flange underlying said body member, expansion springs extending through the openings and having the opposite ends thereof engaging the top leg of the body member and the horizontal flange of the slide bracket, and an axle movable with the slide member.

7. In a vehicle, longitudinally extending frame beams, a U-shaped body member receiving a frame beam and having the upper and lower legs thereof projecting beyond the inner face of the beam, the lower leg of the body member being provided with a plurality of openings, a vertically movable slide bracket mounted on the body member having a bottom flange underlying said body member, expansion springs extending through the openings and having the opposite ends thereof engaging the top leg of the body member and the horizontal flange of the slide bracket, and an axle movable with the slide member and transverse frame beams connected at spaced points to the legs of the body member.

8. In a vehicle, a longitudinally extending frame beam, a U-shaped body member embracing the frame beam and having the upper and lower legs projecting inwardly of the inner face of the frame beam, a slide bracket on the body member having a horizontal flange underlying the body member, the body member being provided with a plurality of openings in its lower leg, expansion springs extending through the openings having opposite ends thereof engaging the upper leg of the body member and the horizontal flange of the slide bracket, a longitudinally extending frame beam rockably mounted on the slide bracket and axles carried by the opposite ends of the axle beam.

9. In a vehicle, a longitudinally extending frame beam, a body member U-shaped in cross section receiving the frame beam and having the upper and lower legs thereof projecting inwardly beyond the frame beam, the lower leg of the body member being provided with a plurality of openings, a slide bracket vertically movable on the body member having a horizontal flange arranged under the body member, a plurality of expansion coil springs extending through the lower leg of the body member and having its opposite ends engaging the upper leg of the body member and the horizontal flange of the slide bracket, a longitudinally extending axle beam arranged below the horizontal flange of the slide bracket, a ball and socket joint connecting the axle beam at a point intermediate its ends with the slide bracket, and transversely extending axles connected with the ends of the axle beam.

In testimony that I claim the foregoing I have hereunto set my hand at Clintonville, in the county of Waupaca and State of Wisconsin.

AUGUST F. KUESTER.